No. 816,971. PATENTED APR. 3, 1906.
L. M. DILL.
FEEDER FOR SUGAR CANE CARRIERS.
APPLICATION FILED JULY 7, 1905.
4 SHEETS—SHEET 2.

WITNESSES:

INVENTOR
Louis M. Dill
BY
ATTORNEYS

No. 816,971. PATENTED APR. 3, 1906.
L. M. DILL.
FEEDER FOR SUGAR CANE CARRIERS.
APPLICATION FILED JULY 7, 1905.
4 SHEETS—SHEET 3.
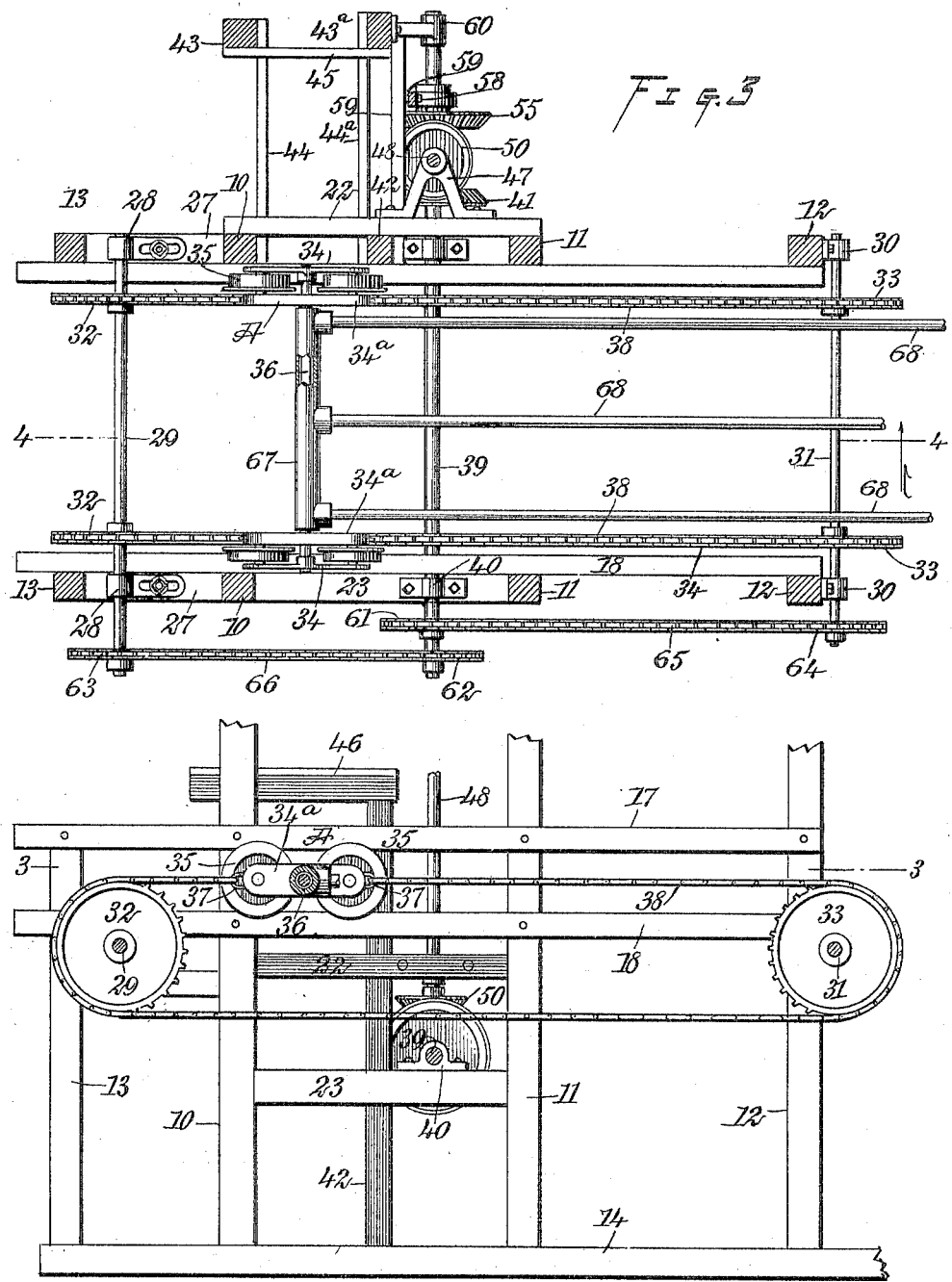
WITNESSES:
INVENTOR
Louis M. Dill
BY
ATTORNEYS No. 816,971. PATENTED APR. 3, 1906.
L. M. DILL.
FEEDER FOR SUGAR CANE CARRIERS.
APPLICATION FILED JULY 7, 1905.
4 SHEETS—SHEET 4.
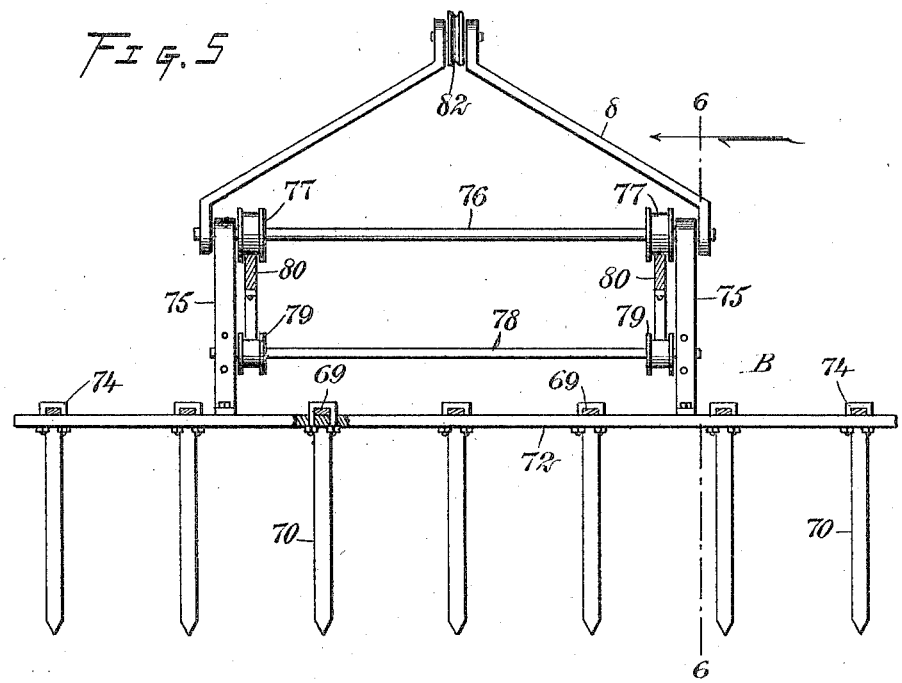
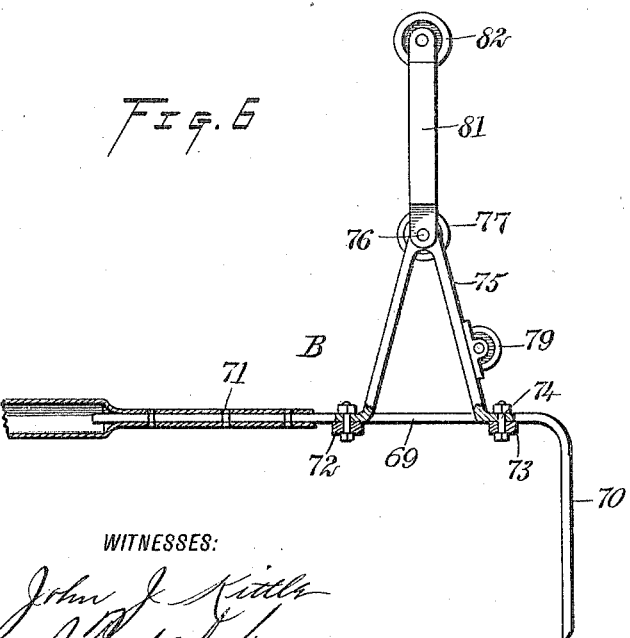
WITNESSES:
INVENTOR
Louis M. Dill
BY
ATTORNEYS

UNITED STATES PATENT OFFICE.

LOUIS MATHEW DILL, OF AVOCA, LOUISIANA.

FEEDER FOR SUGAR-CANE CARRIERS.

No. 816,971.      Specification of Letters Patent.      Patented April 3, 1906.

Application filed July 7, 1905. Serial No. 268,637.

*To all whom it may concern:*

Be it known that I, LOUIS MATHEW DILL, a citizen of the United States, and a resident of Avoca, in the parish of Assumption and State of Louisiana, have invented a new Improved Feeder for Sugar-Cane Carriers, of which the following is a full, clear, and exact description.

The purpose of the invention is to provide a simple and economic machine especially adapted for raking cane from a car upon the carrier which conducts it to the sugar-mill and to so construct the machine that the operator can cause the rake to move forward or backward or be raised or lowered at will.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
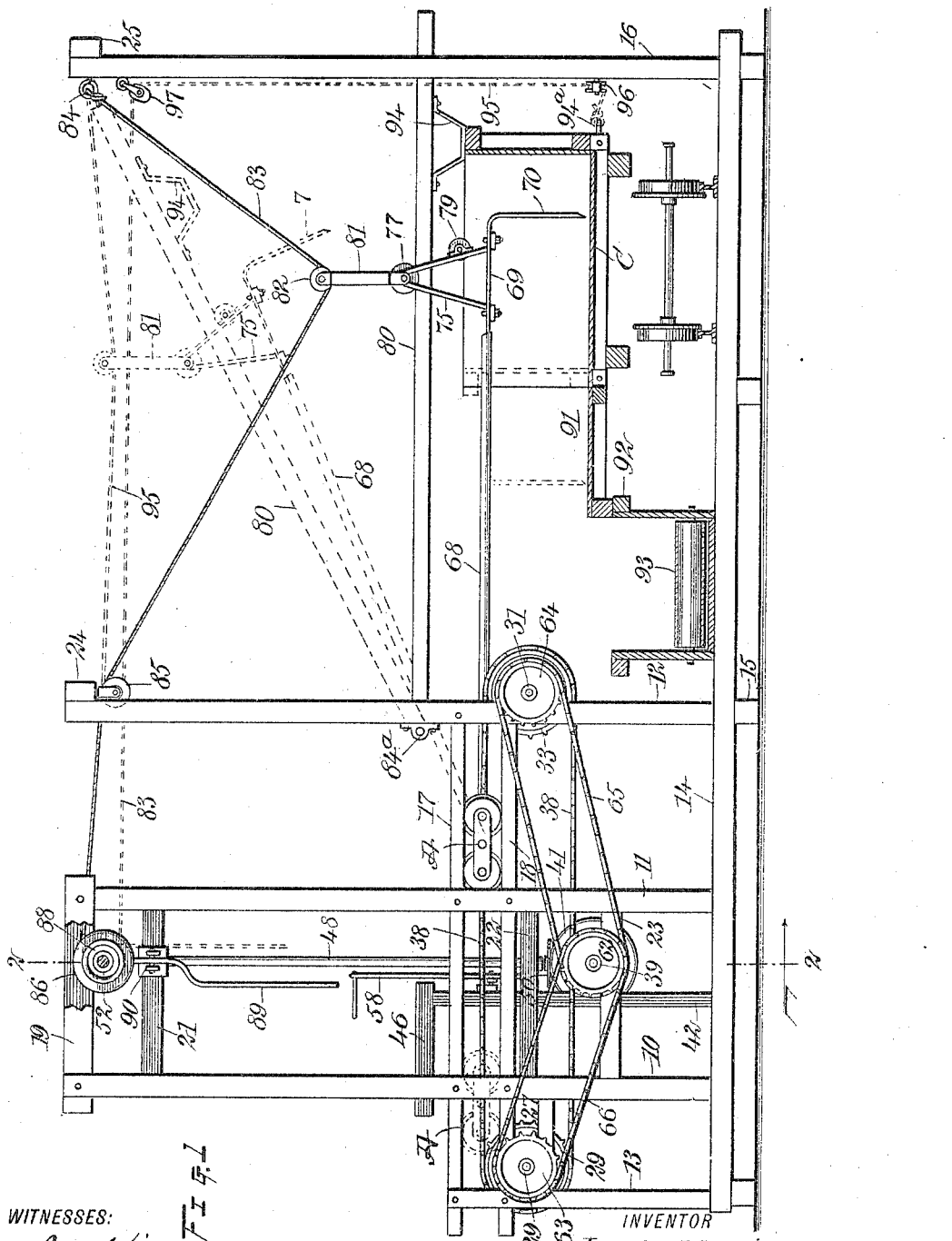
Figure 2:
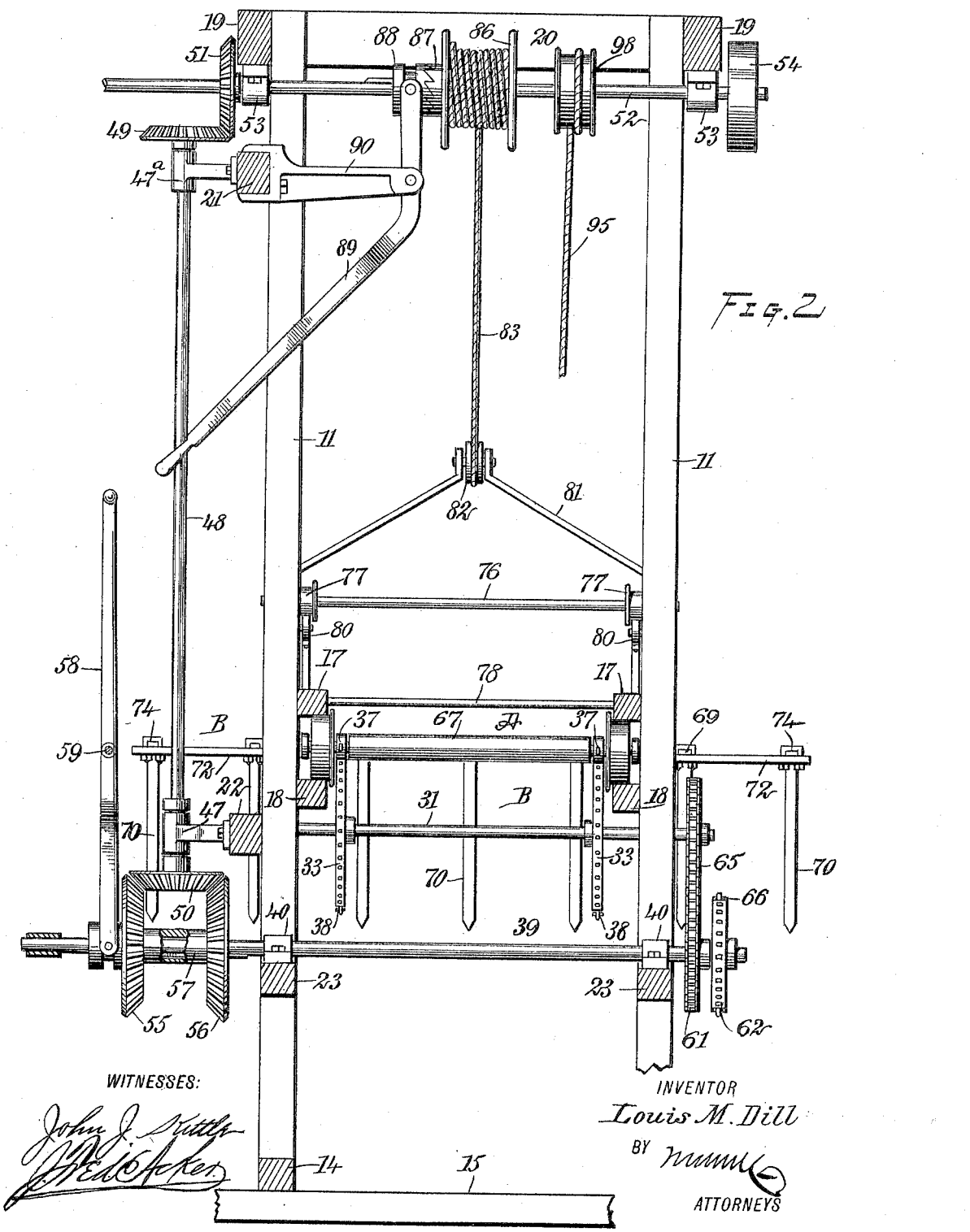

Figure 1 is a sectional side elevation of the improved machine. Fig. 2 is a vertical transverse section taken practically on the line 2 2 of Fig. 1. Fig. 3 is a horizontal section taken substantially on the line 3 3 of Fig. 4. Fig. 4 is a longitudinal vertical section taken practically on the line 4 4 of Fig. 3. Fig. 5 is a transverse section through the rake-head and the track for the lifting-yoke therefor, said yoke being shown in side elevation; and Fig. 6 is a vertical section taken practically on the line 6 6 of Fig. 5.

In constructing the frame of the machine two tall uprights 10 and 11 are located at each side near the rear. Intermediate uprights 12 of the same length are also provided adjacent to the uprights 11, one at each side of the machine, and at the rear of the machine at each side smaller uprights 13 are located. The uprights 10, 11, 12, and 13 are mounted on side beams 14, which side beams usually rest upon sills 15, and at the forward end of the machine uprights 16 are located, one at each side, the uprights 16 being practically of the same height as the uprights 10, 11, and 12. Track-bars 17 and 18 are located at each side of the frame, one above the other, the track-bars being in parallelism, and the said track-bars are attached to the inner faces of the uprights 10, 11, 12, and 13. Side bars 19 connect the upper ends of the uprights 10 and 11, and a cross-bar 20 connects the opposing uprights 11. A similar cross-bar is usually provided for the uprights 10. At the left-hand side of the machine, slightly below the left-hand side bar 19, a second and parallel cross-bar 21 is secured for a purpose to be hereinafter mentioned. Also at the left-hand side of the machine between the center and lower ends of the uprights 10 and 11 a cross-bar 22 is secured. (Illustrated best in Figs. 1 and 2.) The uprights 10 and 11 adjacent to their lower ends are connected at each side by cross-bars 23. (Shown also in Figs. 1 and 2.) A cross-bar 24 connects the upper end portions of the uprights 12 at the front, and a similar cross-bar 25 connects the upper ends of the uprights 16. At a point above the cross-bars 23, yet below the lower track-bars 18, side bars 27 connect the uprights 10 and 13.

Adjustable bearings 28 are secured upon the upper faces of the rear side bars 27, as shown in Fig. 3, and in these bearings 28 a shaft 29 is journaled, which extends beyond the right-hand side of the machine. Bearings 30 of the same height as the bearings 28 are secured to the front faces of the uprights 12, as is also shown in Fig. 3, and in these bearings 30 a shaft 31 is journaled, extending beyond the right-hand side of the machine. Sprocket-wheels 32 are secured on the shaft 29, one near each end within the said frame, while sprocket-wheels 33 of corresponding size are correspondingly located on the forward shaft 31.

A truck A is adapted to travel in that portion of the frame between the uprights 12 and 13 and between the track-bars 17 and 18. This truck A consists of parallel side plates 34 and 34ª, between which side plates flanged wheels 35 are mounted to turn, and said wheels engage with the upper and lower track-bars 17 and 18, as illustrated best in Fig. 4. The side plates of the truck are connected by a bar 36, as is best shown in Fig. 3.

Chains 38 are employed in connection with the said truck, the chains being attached at their ends to the inner plates 34ª of the truck through the medium of staples 37, located at the ends of the said plates, and said chains are made to pass over corresponding sprocket-wheels 32 and 33. A driven shaft 39 is mounted to turn in bearings 40, located upon the lower side bars 23, connecting the uprights 11 and 12, and the said shaft 39 extends beyond both sides of the machine, as is shown in Figs. 2 and 3.

To the rear of the left-hand end of the shaft 39 a short upright 42 is located between the uprights 10 and 11, as shown in Figs. 1 and 3, and in connection with this upright 42 uprights 43 and 43ª are employed of corresponding height, the upright 43 being connected with the upright 10 by side bars 44, and the upright 43ª is connected with the upright 42 by side bars 44ª, while cross-bars 45 connect the uprights 43 and 43ª, thus forming a framework upon which the platform 46 is supported, on which platform the operator stands.

A bracket 47 extends out from the left-hand side bar 22, as shown in Figs. 2 and 3, and a corresponding bracket 47ª extends out from the outer side bar 21, which is above the side bar 22, as is shown in Fig. 2. A shaft 48, which may be termed a "connecting-shaft," is mounted to turn in the said brackets 47 and 47ª, and said shaft is provided with an upper bevel-gear 49 and a lower bevel-gear 50. The upper bevel-gear 49 is in mesh with a corresponding gear 51, said gear being secured to a drive-shaft 52, mounted in suitable bearings 53, secured to the side bars 19, connecting the upper portions of the uprights 10 and 11, the said shaft 52 being provided with a pulley 54 at one end, adapted to be driven by belt connection with the motor employed in the sugar-mill.

The lower gear 50 of the connecting-shaft 48 is located between two bevel-gears 55 and 56, the two gears being connected by a sleeve 57, mounted to slide on the left-hand or driven shaft 39, and the said sleeve is moved on the said shaft 39 by means of a shifting-lever 58, fulcrumed on a side bar 59, forming a portion of the forward part of the aforesaid platform-frame, as is shown in Fig. 3, the pivot for the said shifting-lever 58 being designated as 59ª.

The left-hand end of the driven shaft 39 is mounted to turn in a bearing 60, which is secured to the upright 43ª, as is shown in Fig. 3. Thus it will be observed that by moving the sleeve 57 one or the other of the gears 55 or 56 can be brought into engagement with the gear 50 on the connecting-shaft 48 to turn the shaft 39 in one or the other direction and that the shaft 39 may be rendered silent while the drive-shaft 52 is in motion by moving the sleeve 57 so as to bring the gear 50 between the gears 55 and 56 without touching either, as is indicated in Fig. 2. At the right-hand end of the driven shaft 39 two sprocket-wheels 61 and 62 are secured, and at the right-hand end of the shaft 29 a sprocket-wheel 63 is secured. At the same end of the forward shaft 31 a sprocket-wheel 64 is attached, the sprocket-wheels 63 and 64 and the sprocket-wheels 61 and 62 being of the same size.

A chain belt 65 is passed over the inner sprocket-wheel 61 of the shaft 39 and over the sprocket-wheel 64 of the shaft 31, and a second chain belt 66 is passed over the outer sprocket-wheel 62 on the shaft 39 and over the sprocket-wheel 63 on the rear shaft 29. Thus it will be observed that by alternately bringing one or the other of the gears 55 and 56 in mesh with the gear 50 on the connecting-shaft 48 the chain belts 38, connected with the truck A, are moved in direction to carry the said truck forward or rearward, and in the operation of the machine the truck is first advanced and then carried rearward, and this operation is continued while the machine is in action.

The truck A is adapted to impart lateral reciprocating movement to the rake B. In constructing this rake B a sleeve 67 is loosely mounted on the shaft 36 between the said portions of the truck A, as is shown best in Fig. 3, and preferably three rods 68 are secured to the said sleeve, which rods extend forward beyond the front uprights 12 and within a predetermined distance of the forward uprights 16, as is shown in Fig. 1. The forward ends of the rods 68 are flattened, as is shown in Fig. 6, and the horizontal shanks 69 of downwardly-extending rake-teeth 70 are passed into the flattened portions of the rods 68, being preferably tubular, as illustrated. Parallel bars 72 and 73 are secured to the under faces of the shanks 69 of the rake-teeth, the said bars 72 and 73 extending some distance beyond the sides of the machine, and the shanks of the rake-teeth are secured to said bars by means of clips 74 or their equivalents. The three central rake-teeth are the only ones that are secured to the rods or bars 68, the other rake-teeth having their shanks secured directly to the head-bars 72 and 73. Yokes 75 are secured to the head-bars of the rake, one at each side of the center, and a shaft 76 is passed through the upper ends of the said brackets, extending beyond their outer side faces, and on the said shaft 76 near each end and adjacent to the inner faces of the brackets peripherally-grooved pulleys 77 are mounted to turn. A second shaft 78 is journaled in suitable bearings on the lower portions of the said brackets 75 at their forward faces, and the shaft 78 is provided with peripherally-grooved pulleys 79, which are in vertical alinement with the pulleys 77, as is shown in Figs. 5 and 6.

Track-bars 80 are pivoted at their rear ends upon a shaft 80ª, secured in bearings attached to the rear edges of the uprights 12, as is shown in Fig. 1, and these track-bars 80 are passed between opposing pulleys 77 and 79 and are sufficiently long when in a horizontal position to extend out beyond the front of the machine, as is also shown in Fig. 1.

When the rake is in its lower or working position, the upper pulleys 77 engage with the said track-bars 80, and when the rake is raised the lower pulleys 79 engage with the said track-bars. A bail 81 is pivoted on the outer ends of the upper shaft 76, and said bail at its central portion is provided with a peripherally-grooved pulley 82, as is shown in Figs. 1 and 5.

A cable 83 is secured at one end to the cross-bar 25, connecting the upper ends of the front standard 16, and the said cable is passed beneath the pulley 82 on the bail of the rake-head, as is illustrated in Fig. 1, and is then passed over a pulley 85, suspended from the cross-bar 24, connecting the uprights 12, and the other end of the cable 83 is attached to the drum 86, loosely mounted on the drive-shaft 52, as illustrated in Fig. 2. This drum is provided with a clutch-face 87, adapted when the drum is to be turned to be engaged by a clutch 88, mounted to slide upon and turn with the drive-shaft 52, and the said clutch 88 is operated by means of a lever 89, fulcrumed upon an arm 90, extending horizontally from the upper left-hand side bar 21, as is also shown in Fig. 2. Thus it will be observed that the rake is given forward and rearward movement through the medium of the truck A, and the rake is lifted to the position shown by dotted lines in Fig. 1 when the clutch 88 is engaged with the clutch-face of the drum 86. When the rake is to be lowered, the clutch 88 is disconnected from the drum and the rake falls by gravity.

C represents a car from which the cane is to be taken, and the said car is provided with drop sides 91. When the car is in position relative to the machine or is in position to receive the head of the rake, as shown in Fig. 1, the side 91, which is dropped, rests upon the upper edge of the casing 92, in which the carrier 93 is located, adapted to take the cane to the sugar-mill, and in order that the rake-teeth shall not touch the bottom of the car when the rake is in its lowest position stirrups 94 are secured to the track-bars 80, which stirrups when the track-bars are in their lowest position engage with the upper edge of the car, as is shown in Fig. 1.

The car can be drawn into position by the operation of the drive-shaft 52 in the following manner: A cable 95 is attached to an eye 94ª or its equivalent secured to the side of the car, as is shown in Fig. 1, and the said cable 95 is passed over a pulley 96, located at the inner face of an upright 16, and is then carried up over a second pulley 97 at the upper portion of the same upright, and from the pulley 97 this second rope or cable 95 is carried to a drum 98, secured upon the drive-shaft 52, being given, for example, one turn around the drum, and the other end of the cable 95 is permitted to hang down within easy reach of the person on the platform 46. When the cable 95 is attached to a car and it is desired to draw the car into position, it is simply necessary for the operator to draw down upon the free end of the cable 95, thus bringing it in strong frictional contact with the drum 98, whereupon as the shaft 52 revolves the cable is wound on the drum 98, and when the car has been brought to its proper position the operator simply releases the free end of the cable 95, whereupon as the shaft 52 revolves it has no influence whatever on said cable.

Having thus described my invention, I claim as new and desire to secure by Letters Patent—

1. In a feeder for sugar-cane carriers, a truck, track-bars for the truck, a driving mechanism for automatically moving the truck backward and forward, a rake connected with the truck, and guide and lifting devices for the rake.

2. In a feeder for sugar-cane carriers, a frame, parallel track-bars at the sides of the frame, a truck, the wheels of which travel between and in engagement with the track-bars, parallel shafts below the track-bars and sprocket-wheels carried thereby, chain belts passed over said sprocket-wheels, which chain belts are secured to the forward and rear portions of the truck, a rake pivotally mounted upon the truck, and a driving mechanism which imparts alternate forward and rearward movement to the truck.

3. In a feeder for sugar-cane carriers, a frame, parallel track-bars at the side portions of the frame, a truck provided with a central bar, the wheels of which truck travel between and in engagement with the track-bars, shafts mounted to turn in the frame below the track-bars, sprocket-wheels carried by the shafts, chain belts passed over the sprocket-wheels, having their ends secured to the front and rear of the truck, a rake pivotally mounted upon the bar of the truck, means for raising and lowering the rake, a driven shaft, separate belt connections between the driven shaft and the shafts carrying the truck-belts, a drive-shaft, and a connecting-shaft driven from the drive-shaft, the said connecting-shaft having a bevel-gear at its lower end and sleeves mounted to slide upon the driven shaft and to turn therewith, bevel-gears secured to the sleeve, one at each side of the said gear on the connecting-shaft, and a shifting device for the sleeve.

4. In a feeder for sugar-cane carriers, a frame, track-bars at the sides of the frame, shafts journaled in the frame below the track-bars, the said shafts being in parallelism, a truck the wheels of which travel between and in engagement with the said track-bars, sprocket-wheels upon the said shafts, chain belts secured to the front and the rear portions of the truck, being also passed over the said sprocket-wheels, a rake pivotally carried by the said truck, a guide-frame located on the rake-head, having upper and lower friction-rollers, track-bars pivoted to the frame and passed between the friction-rollers of the said guide-frame for the rake, means for alternately moving the said truck backward and forward, a drive-shaft, a drum loosely mounted on the said shaft, a clutch adapted for engagement with the drum, means for operating the clutch, and a cable secured to the frame and having supporting engagement with the rake-head, the said cable being attached to the said drum.

5. In a feeder for sugar-cane carriers, a frame, track-bars at the sides of the frame, parallel shafts journaled in the said frame, sprocket-wheels carried by the said shafts, a truck, the wheels whereof travel between and in engagement with the track-bars, the truck being provided with a central bar, a rake pivotally mounted on the bar of the truck, chain belts secured to the forward and rear portions of the truck, being passed over the said sprocket-wheels, a drive-shaft, a driven shaft, a connecting-shaft between the driven and the drive shafts, reversing-gear carried by the driven shaft and operating in connection with the connecting-shaft, a guide-frame attached to the rake-head, upper and lower friction-rollers carried by the said guide-frame, track-bars pivoted to the frame, which track-bars are passed between the said friction-rollers of the said guide-frame, stirrups secured to the pivoted track-bars near their outer ends, a bail pivotally mounted on the guide-frame of the rake, a drum loosely mounted on the drive-shaft, a clutch for the said drum and means for operating it, a cable attached to the frame and passed to a supporting engagement with the said bail and to an attachment to the said drum.

6. In a feeder for sugar-cane carriers, a frame, track-bars at the sides of the frame, parallel shafts journaled in the said frame, sprocket-wheels carried by the said shafts, a truck the wheels whereof travel between and in engagement with the track-bars, the truck being provided with a central bar, a rake pivotally mounted on the bar of the truck, chain belts secured to the forward and rear portions of the truck, being passed over the said sprocket-wheels, a drive-shaft, a driven shaft, a connecting-shaft between the driven and the drive shafts, reversing-gear carried by the driven shaft and operating in connection with the connecting-shaft, a guide-frame attached to the rake-head, upper and lower friction-rollers carried by the said guide-frame, track-bars pivoted to the frame, which track-bars are passed between the said friction-rollers of the said guide-frame, stirrups secured to the pivoted track-bars near their outer ends, a bail pivotally mounted on the guide-frame of the rake, a drum loosely mounted on the drive-shaft, a clutch for the said drum and means for operating it, a cable attached to the frame and passed to a supporting engagement with the said bail and to an attachment to the said drum, a carrier which crosses the frame, a car having drop sides, adapted to receive the rake-head, one side of the car being adapted to engage with the frame of the carrier, a cable attached to the car, roller-guides for the cable carried by the frame, and a drum on the drive-shaft, over which the cable is loosely passed.

7. In a feeder for sugar-cane carriers, a truck, means for moving the truck backward and forward, a rake connected with the truck to be moved back and forth thereby, and a track upon which the outer end of the rake travels.

8. In a feeder for sugar-cane carriers, a truck, means for moving the truck backward and forward, a rake connected with the truck and partaking of the movements thereof, a hinged track upon which the rake travels, and means for raising and lowering the track and rake.

9. In a feeder for sugar-cane carriers, a truck, means for moving the truck backward and forward, a rake connected with the truck to partake of the movements thereof, a hinged track upon which the rake travels, a lifting device for the rake, and means whereby the track will be raised with the rake.

10. In a feeder for sugar-cane carriers, a rake, means for moving the same backward and forward, a frame carried by the rake-head and provided with rollers, and a track upon which the said rollers travel.

11. In a feeder for sugar-cane carriers, a rake, means for moving the rake backward and forward, a frame carried by the rake-head and provided with rollers spaced apart, a hinged track extending between the said rollers, and a lifting device connected with the said frame.

12. In a feeder for sugar-cane carriers, a rake, means for moving the rake backward and forward, a frame carried by the rake-head, parallel shafts mounted in the frame and each provided with grooved pulleys, hinged track-bars extending between the pulleys of the said shafts, a bail secured to the frame, and a lifting device connected with the bail.

In testimony whereof I have signed my name to this specification in the presence of two subscribing witnesses.

LOUIS MATHEW DILL.

Witnesses:
S. MILLS MALLICOT,
T. P. TALBOT, Jr.